May 17, 1938.  R. HILL  2,117,321
MANUFACTURE OF NEW POLYMERIZATION PRODUCTS
Filed Dec. 1, 1932
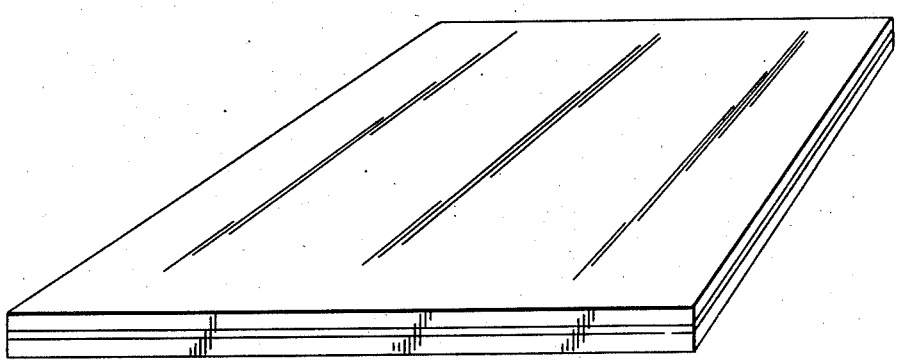
INVENTOR.
Rowland Hill
BY W. R. Gawthrop
ATTORNEY.

UNITED STATES PATENT OFFICE 2,117,321

MANUFACTURE OF NEW POLYMERIZATION PRODUCTS

Rowland Hill, Blackley, Manchester, England, assignor to Imperial Chemical Industries Limited, a corporation of Great Britain Application December 1, 1932, Serial No. 645,318
In Great Britain December 2, 1931

17 Claims. (Cl. 260—2)

This invention relates to the manufacture of polymerization products possessing characteristic and valuable physical properties, which render them valuable for use as ingredients in coating compositions, for use as molding compositions either by themselves or admixed with other ingredients, and for use in the manufacture of unsplinterable glass.

It has been proposed to use the polymerization products of methyl or ethyl acrylate or mixtures of the two in the manufacture of compound glass, and it has been proposed to use various other substances, for instance, a polymerized itaconic ester, a polymerized ethyl ester of crotonic acid, and polymerized vinyl esters not to mention such mixtures as contain cellulose esters.

Unsplinterable glass consists of a sandwich of an interlayer of transparent material between two sheets of common glass, the interlayer material acting also as a cement, or being fixed to the glass by a separate cementing medium. It is the interlayer thus cemented which prevents the glass from splintering when fractured, and a good interlayer material should be hard, tough, sufficiently elastic to draw back splintered glass, and should give an even surface, transparent, and colorless, and it should conserve these properties so long as the material is in use and over the range of temperatures usually covered by climatic changes.

Consequently to provide a suitable interlayer material is a problem the solution of which is only being reached by stages, and the proposals above referred to have not, in my experience, provided a fully satisfactory solution.

The present invention is directed particularly to the solution of this problem.

The physical properties of the polymerization products obtained according to the invention are, however, such that the products find valuable application also in the manufacture of molded bodies and coating compositions.

The hitherto unknown methyl methacrylate (methyl α-methyl-acrylate) is converted on polymerization, for example, by the methods described as applicable to organic vinyl esters in British specification No. 15,271/1914 into a very hard tough glassy mass, which has a conchoidal fracture and can be pulverized. Because of its hardness and lack of elasticity this material cannot be used by itself in the manufacture of unsplinterable glass, altho it is so tough. Known methacrylates, and the alkyl esters of acrylic acid itself, on the other hand, all yield on polymerization either brittle masses or soft rubber-like flexible products.

According to the invention new polymerization products are made by subjecting to polymerization a mixture of the hitherto unknown methyl methacrylate and a suitable proportion of at least one polymerizable material and particularly polymerizable unsaturated esters and even more specifically those containing an ethylenic linkage conjugated with a multiply bonded carbon, i. e. $H_2C=C-C=x$ or $H_2C=C-C\equiv x$, or those containing a doubly bonded carbon directly attached to a negative group, such as esters of acrylic acid, e. g. methyl acrylate; or other esters of methacrylic acid, e. g. butyl methacrylate; vinyl esters, e. g. vinyl acetate, vinyl chloride, styrene, vinyl cyanide; itaconic esters, e. g. dimethyl itaconate. Interpolymers are also obtained in accordance with the invention by polymerizing methyl methacrylate with polymerizable materials such as acrolein, methyl vinyl ketone, synthetic resins in the initial stages of polymerization, e. g. high acid number polyhydric alcohol-polybasic acid condensation products, incompletely polymerized phenol formaldehyde resins, urea-formaldehyde resins, p-toluenesulfonamide-formaldehyde resins, etc.

The hitherto unknown methyl methacrylate may be obtained by treating methyl α-hydroxy-iso-butyrate with a dehydrating agent, e. g. phosphorus pentoxide, as more fully described in my copending application, Serial No. 641,113, filed Nov. 3, 1932, on which U. S. Patent 1,980,483 was granted Nov. 13, 1934. It may also be prepared by the method described in the application of Donald J. Loder, filed February 8, 1932, Serial No. 593,411, i. e. by chlorination of isobutyric acid, esterification of the chlor-acid with methyl alcohol and dehalogenation of the chlor-ester. In the present specification the generally accepted term "methacrylate" is used as a convenient synonym for α-methylacrylate (cf. von Richter's Organic Chemistry, translated by Spielmann, London, 1919, Vol. I, p. 297). Other methacrylates are obtained by similar means from the corresponding hydroxy-iso-butyric esters.

The polymerization is effected by subjecting the mixture to the action of radiant energy (heat and/or light), oxygen, or oxygen-containing substances, separately or together. Any of the polymerization promoting means known (cf. British specification No. 15,271/1914) may be used, but I preferably use benzoyl or other peroxides. The polymerization may be effected in a solvent, e. g. toluene, and the operation may be carried out under pressure. The substance may also be emulsified and then polymerized.

The polymerization products so obtained are both hard and very tough. They are soluble in ester, ketone, and aromatic hydrocarbon solvents. In these as in other properties they differ from mere mixtures of the separately polymerized ingredients. The properties naturally vary according to the proportions of the ingredients but the relationships between properties and composition are not linear. Evidently polymerization takes place in such a way that the chains of monomer residues produced are mixed and the nature of the product depends on the particular way in which these mixed chains are formed.

When the interpolymers of the present invention are used as the interlayer in safety glass combinations they may form both interlayer and adhesive therefor or a separate adhesive may be used. As adhesives, gelatin, casein, cellulose derivatives, such as the acetate, nitrate, ethyl ether, etc., resins such as polyhydric alcohol-polybasic acid resins, dephenylolpropane-aldehyde resins, toluenesulfonamide-aldehyde resins, vinyl resins, etc. may be used. When no separate adhesive is used the interlayer is preferably caused to adhere to the glass layers by means of heat and pressure with or without the aid of added solvent and/or plasticizer. In general an interpolymer containing from 10-75% methyl methacrylate is preferred as an interlayer material. Mixtures of these interpolymers with natural or synthetic resins, cellulose derivatives, or other plastic materials may be used.

When the new polymerization products are to be used in the production of molded bodies, they are, if necessary, pulverized, and are then molded, with or without the addition of fillers, plasticizers, pigments, dyes, or other thermoplastic resinous materials, by a heat and pressure treatment. The molding may also be carried out by an extrusion process, the polymerization product being put into an appropriate container and heated to a temperature at which it is sufficiently plastic, and being then extruded by pressure into a cooled mold.

The polymerization products are also valuable for the manufacture of flexible transparent films, such as cinematograph films.

The polymerization products are also valuable for use as ingredients in coating compositions, such as lacquers, enamels and the like. The properties of the coating compositions can be modified over a wide range by the addition of film-forming materials such as cellulose esters and ethers, e. g. nitrocellulose, cellulose acetate, and ethyl and benzyl cellulose, and/or plasticizers, e. g. dibutyl phthalate and tricresyl phosphate. Pigments, extenders, dyestuffs, fatty oils of the drying, semi-drying or non-drying type, and synthetic and natural resins may also be added.

The invention is illustrated but not limited by the following examples in which the parts are by weight.

Example 1.—1 part of methyl methacrylate B. P. 100–101° C. and 3 parts of methyl acrylate B. P. 78–81° C. are mixed. 0.04 part of benzoyl peroxide is added. The mixture is heated to 55–60° C. for 16 hours.

The resulting mass is very pale straw in color. It is moderately hard, elastic and very tough. It dissolves in such organic solvents as toluene, ethyl and butyl acetates, and glycol monoethyl ether. It may be rolled when warm (e. g. at 45–50° C.) into tough elastic sheets.

Example 2.—10 parts of methyl methacrylate B. P. 100–101° C. and 10 parts of ethyl acrylate B. P. 98–101° C. are mixed. 0.2 part of benzoyl peroxide is added and the mixture is heated for 4 hours at 100° C.

The product is almost colorless and does not discolor on exposure to light. It is hard and tough. It may be milled on rolls like the product of Example 1 to give transparent tough sheets. It is soluble in organic solvents and compatible with nitrocellulose.

Example 3.—1 part of methyl methacrylate and 3 parts of n-butyl methacrylate are mixed. 0.04 part of benzoyl peroxide is added, and the mixture is heated for 8 hours at 100° C.

The product is moderately hard and tough, and resembles the products of the preceding examples. n-butyl methacrylate may be obtained from n-butyl α-hydroxy-iso-butyrate by dehydration e. g. with phosphorus pentoxide.

Example 4.—1 part of vinyl acetate, 2 parts of methyl methacrylate and 0.015 part of benzoyl peroxide are mixed and heated at 65° C. Polymerization begins after about two hours, and is substantially complete after 18 hours. The new polymerization product obtained is a hard, tough, colorless product with a high softening point.

For molding the product is pulverized and, for example, 10 grams are introduced into a flash type disc mold 2 inches in diameter, which is then heated at 120° C. for 2 minutes under a pressure of ½–2 tons per sq. inch. The mold is cooled to 80° C. and the molding ejected. A transparent tough disc is obtained.

Example 5.—3 parts of methyl methacrylate and one part of acrylic nitrile are mixed and 0.04 part of benzoyl peroxide is added. The mixture is heated at 60° C. for 18 hours.

The new polymerization product so obtained is pale yellow in color. This is hard, tough and resilient, and possesses high tensile strength and impact resistance. It may be molded as described in Example 4.

Example 6.—2 parts of methyl methacrylate are mixed with 1 part of methacrylic nitrile, 0.03 part of benzoyl peroxide is added and the mixture heated at 60° C. for 20 hours, then at 100° C. for 9 hours.

The product is pale straw in color, transparent, hard and tough.

Example 7.—1 part of methyl methacrylate and 1 part of methyl acrylate are mixed. 0.006 part of sodium perborate and 0.03 part of acetic anhydride are added and the mixture is then heated at 60° C. for 30 hours, when polymerization appears to be complete.

The so obtained polymerization product is hard, tough, flexible, transparent and colorless.

Example 8.—10 parts of methyl methacrylate and 15 parts of methyl acrylate are mixed with 0.12 part of benzoyl peroxide, and the mixture is heated for 4 hours at 120° C. and then for 4 hours at 130° C. under a pressure of 300 lbs. per sq. inch.

The resulting interpolymer is colorless, transparent, moderately elastic and very tough. It can be rolled into sheets which are then well suited for use in the manufacture of compound safety glass.

Example 9.—A mixture of ten parts of methyl methacrylate and 15 parts of methylacrylate containing 0.25 part of benzoyl peroxide is added slowly with rapid stirring to a solution of 1 part of sodium iso-propylnaphthalene-sulfonate and 0.5 part of Turkey-red oil in 100 parts of water at 25° C.

The emulsion produced is heated for 12 hours at 60° C. and cooled. 1 part of aqueous hydrogen peroxide (20 vols.) is then added, and the mixture is heated again, at 80° C., for a further 4 hours.

After cooling, the emulsion is coagulated by pouring it with rapid stirring into 250 parts of 3.5% hydrochloric acid. The white coagulum is filtered off, washed free from acid, and dried.

The dried product is soluble in a wide range of common organic solvents and is compatible with nitrocellulose.

*Example 10.*—10 parts of methyl methacrylate and 10 parts of methyl vinyl ketone are mixed with 25 parts of butyl acetate and 0.1 part of benzoyl peroxide and heated for 8 hours under a reflux condenser. The resulting product is a viscous, transparent, very pale yellow mass, soluble in additional solvent and thus suitable in the preparation of lacquers and safety glass.

*Example 11.*—10 parts of methyl methacrylate and 10 parts of vinyl acetate are mixed with 0.1 part of benzoyl peroxide and heated for 10 hours under super-atmospheric pressure at 80° C. The product is a water white, transparent, hard, tough, solid, soluble in ester ketone and aromatic hydrocarbon solvents.

*Example 12.*—2 parts of methyl methacrylate and 8 parts of vinyl chloride are mixed with 20 parts of toluene and 0.05 part of benzoyl peroxide and heated for 12 hours, at 105° C. in a closed container or passed under pressure thru a tube heated to 105° C. at such a rate that they remain in the heated zone for the same length of time. The product is transparent, slightly yellow, and soluble in aromatic hydrocarbon solvents.

Polymerization under the influence of heat and/or light, without a catalyst, such as benzoyl peroxide, is slower, requiring at least four times as much time as the catalyzed polymerization.

I claim:

1. Process for the manufacture of new polymerization products comprising subjecting to polymerizing conditions, a mixture containing methyl methacrylate and at least one other unsaturated polymerizable ester.

2. Process for the manufacture of new polymerization products comprising subjecting to polymerizing conditions a mixture containing methyl methacrylate and at least one other polymerizable organic material containing the grouping H₂C=C—CX where X is joined to carbon by more than one bond.

3. Process for the manufacture of new polymerization products comprising subjecting to polymerizing conditions a mixture containing methyl methacrylate and an ester of acrylic acid.

4. Process for the manufacture of new polymerization products comprising subjecting to polymerizing conditions a mixture containing methyl methacrylate and methyl acrylate.

5. Process for the manufacture of new polymerization products comprising subjecting to polymerizing conditions a mixture containing methyl methacrylate and an ester of methacrylic acid.

6. Process for the manufacture of new polymerization products comprising subjecting to polymerizing conditions a mixture containing methyl methacrylate and butyl methacrylate.

7. Process for the manufacture of new polymerization products comprising subjecting to polymerizing conditions a mixture containing methyl methacrylate and a vinyl ester.

8. Process for the manufacture of new polymerization products comprising subjecting to polymerizing conditions a mixture containing methyl methacrylate and vinyl acetate.

9. As a new article of manufacture a resin having the properties of the product obtained by polymerizing a mixture of methyl methacrylate and at least one other polymerizable organic material.

10. As a new article of manufacture a resin having the properties of the product obtained by polymerizing a mixture of methyl methacrylate and at least one other polymerizable organic material containing the grouping H₂C=C—CX where X is joined to carbon by more than one bond.

11. A plastic mass comprising the product of joint polymerization of methyl methacrylate and an acrylic acid ester.

12. A plastic mass comprising the product of joint polymerization of methyl methacrylate and methyl acrylate.

13. The product of joint polymerization of a mixture comprising methyl methacrylate and another derivative of methacrylic acid.

14. The product of joint polymerization of a mixture comprising methyl methacrylate and another ester of methacrylic acid.

15. The product of joint polymerization of a mixture comprising methyl methacrylate and another lower alkyl ester of methacrylic acid.

16. The product of joint polymerization of a mixture comprising methyl methacrylate and another unsaturated polymerizable organic compound from the group consisting of vinyl esters and esters of acrylic and methacrylic acids.

17. Process for the manufacture of new polymerization products comprising subjecting to polymerizing conditions a mixture containing methyl methacrylate and another unsaturated polymerizable organic compound from the group consisting of vinyl esters and esters of acrylic and methacrylic acids.

ROWLAND HILL.